June 29, 1943.  M. AUWÄRTER ET AL  2,323,000
GUIDE FOR MOLTEN SILICATES
Filed Sept. 21, 1940

Inventors
Max Auwärter
Alfred Jedele &
Konrad Rathardt
By McCaleb & Wendt
Attys.

Patented June 29, 1943

2,323,000

UNITED STATES PATENT OFFICE 2,323,000

GUIDE FOR MOLTEN SILICATES

Max Auwärter, Alfred Jedele, and Konrad Ruthardt, Hanau-on-the-Main, Germany; vested in the Alien Property Custodian Application September 21, 1940, Serial No. 357,784
In Germany October 10, 1939

4 Claims. (Cl. 49—55)

The present invention broadly refers to receptacles and devices subjected to direct contact with molten silicates. The invention also includes devices comprising a guide for molten silicates in any respect.

More particularly the invention relates to receptacles and devices directly in contact with molten or liquid glass.

The invention especially involves refractory bodies used in the production, storing and working up, and particularly in the shaping, of glass. Receptacles for molten glass and devices serving for working up molten glass, for example for leading the molten glass to definite places or for shaping it in a special manner, for instance into threads, are exposed to considerable mechanical, thermal and chemical strains. When temperatures above the melting point are applied, glass is chemically rather aggressive, particularly at those places at which the atmosphere contacts with the surface of the molten glass, for example at places lying within the surface level of the molten glass, or at the outlets through which the molten glass emerges either for being led to a special device for working up the glass or for being transformed to the solid state in the form of glass threads. Particularly in the latter case there is the difficulty in getting an orifice of constant diameter which insures the production of threads of uniform diameter. The chemical action of the molten glass heated to high temperatures in connection with the friction of the glass stream passing with considerable speed through a very narrow outlet, cause a disintegration of the refractory body that changes the shape and width of the outlet.

Therefore, the invention has for its main object to increase the commercial value of spinnerets for the production of glass threads by manufacturing spinnerets having a longer period of life and producing glass threads of uniform diameter, even after being used for a long period of time.

The invention aims to provide receptacles and devices which are exposed to a direct contact with molten silicates, with liners which are adapted to withstand all the above mentioned strains and to produce a hard and smooth surface that will not be changed by the frictional contact and the chemical influences of the molten glass at high temperatures. For this purpose, the invention uses platinum alloys containing a base metal which alloys have the surprising effect that they solve the problem in an excellent manner and therefore permit the saving of expensive noble metals. The receptacles which consist of refractory bodies adapted to receive molten glass, and the devices for the production and shaping of molten glass are coated with the novel lining. Furthermore, such parts as are in contact with molten glass are manufactured from the novel material even if they are not used as a lining in refractory bodies.

The invention is illustrated, by way of example, in the accompanying drawing which shows spinnerets for the production of fine glass threads. It should be understood that the invention is not restricted to this embodiment but may also be applied to other devices and used for other purposes.

Figure 1:
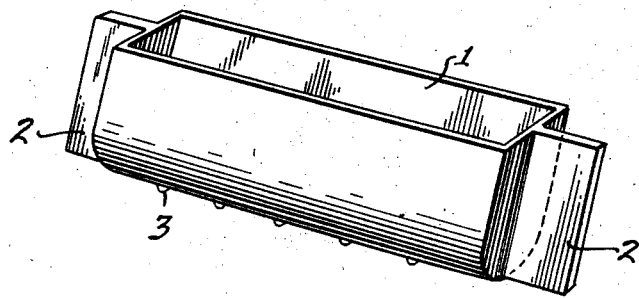
Fig. 1 is a perspective view of a refractory receptacle including the spinneret described hereafter which is adapted for the production of fine threads of molten glass.

Referring to the drawing the spinneret is preferably embodied in a refractory body, comprises a body 1 of a suitable shape (in this example it takes the form of a trough) to which the current leads 2 are attached which heat the device up to the necessary temperature by direct current or maintain this temperature. At the bottom of the trough at 3 a number of orifices are provided through which the molten glass contained in the body of the spinneret emerges and is spun into a thread.

In our invention the material of which the spinneret is made is of essential importance, that means the material for the part which is in direct contact with the molten glass. As material for the liner an alloy of platinum and copper is used in which platinum constitutes the major portion. The proportions are in general seventy percent (70%) to ninety-nine percent (99%) of platinum and one percent (1%) to thirty percent (30%) of copper. Preferably, such alloys are used the proportions of which are 85% to 95% of platinum and 5% to 15% of copper. For example, an alloy of 90% of platinum and 10% of copper is used.

Figure 2:
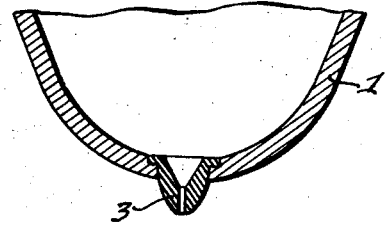
Fig. 2 is a section through the device to be provided at the outlets of a spinneret according to Fig. 1 which device is adapted to increase the period of life of the spinneret. The device is shown, for the sake of clearness, in enlarged section.

The platinum-copper alloys admirably fulfill all the requirements mentioned above. Therefore, these alloys are preferably applied to those parts having to resist the highest strains, for instance to the spinning orifices of spinnerets. Instead of a spinning orifice being formed merely by providing a hole in the wall of the spinneret body such orifice is preferably formed in a separate member which is fitted into a wall of the spinneret body. Such a member is illustrated in Fig. 2 in enlarged section. At 3 a separate member is to be seen inserted in the spinneret body 1. Usually the dimensions of these inserted members are within the limits of a few millimetres. The spinning orifice retains its shape better and a further increase in durability is attained. The member 3 consists of a cold worked alloy of platinum and copper and may be made, for example, from rods in a lathe. The member 3 is fitted in the spinneret body wall either flush with the outer surface therein or as a nozzle projecting beyond the body wall. In order to secure better connection between the member 3 and the spinneret body 1 these parts may be united by means of an alloy of lower melting point than the metal of the spinneret body. The spinneret body and the separate members are made of alloys of platinum and copper. In some embodiments the spinneret body may be made of another metal, for example of platinum or a platinum alloy containing a metal different from copper, and only the separate members may consist of an alloy of platinum and copper.

The described spinnerets for the production of glass threads made of platinum-copper alloys are only examples of the general application of such alloys for receptacles and devices subjected to contact with molten silicates, particularly molten glass, preferably at places at which the atmosphere contacts with the surface of molten glass. Liners for refractory bodies are used which are made of alloys of platinum and copper. Parts made of platinum-copper alloys show specially great hardness. They withstand the frictional strain of molten glass without changing their shape. They also maintain their excellent chemical resistance to the influence of molten glass when high temperatures are applied. We have found that the platinum-copper alloys, for example when heated, tarnish less than hard alloys which consist only of platinum metals, as alloys of platinum and ruthenium and of platinum and osmium which are known to be specially hard, and we have furthermore found that the novel alloys excel other alloys containing base metal, such as alloys of platinum and nickel.

Furthermore the losses of weight at high temperatures are extraordinarily low as will be shown by the following tests:

Parts of alloys composed of 90% of platinum and 10% of ruthenium, 90% of platinum and 10% of iridium, and 90% of platinum and 10% of copper were heated to a temperature of 1300° C. during 14 hours under the same conditions, particularly with the same surface and the same shape of the parts. The results are as follows:

The alloy containing ruthenium had a loss of weight in the average of 0.75%, the alloy containing iridium such of 0.19%, the alloy containing copper, however, only such of 0.11%. It is essential in this connection that this remarkable thermal constancy is not attained at the cost of the chemical and mechanical properties. The metal, hitherto added to platinum as the best for increasing the hardness, is the expensive rare metal iridium. We have found that an addition of 4% of copper increases the hardness to the same extent as an addition of 8% of iridium. This shows that considerably less quantities of copper have the same effect as iridium. Therefore, it is one of the advantages of the invention that the properties of platinum are improved by the addition of an inexpensive base metal.

It follows from the described advantages of the parts being in contact with molten glass made of platinum-copper alloys that the scope of the invention is not limited to spinnerets for the production of glass threads but relates in general to any receptacles and devices which are in contact with molten glass or, more generally, with molten silicates, for example to receptacles in which molten glass is deposited, up to the range of the surface level of the molten glass.

We claim:

1. In the manufacture and handling of glass a metallic part required to be in direct contact with molten silicates, said part formed of an alloy of platinum and copper in the proportion of from seventy percent (70%) to ninety-nine percent (99%) of platinum and from one percent (1%) to thirty percent (30%) of copper.

2. In the manufacture and handling of glass a metallic part required to be in direct contact with molten glass, said part formed of an alloy of platinum and copper in the proportion of from 85% to 95% of platinum and from 5% to 15% of copper.

3. In a spinneret for spinning glass threads a trough to which current leads are attached, the trough containing at the symmetrical line discrete members secured in the wall of the trough, each having a spinning orifice extending therethrough, said discrete members being made of an alloy of platinum and copper in the proportion of from 70% to 99% of platinum and from 1% to 30% of copper.

4. In a device for spinning glass threads a metallic part required to be in direct contact with molten glass, said part formed of an alloy consisting of 90% of platinum and 10% of copper.

MAX AUWÄRTER.
ALFRED JEDELE.
KONRAD RUTHARDT.